Oct. 16, 1923.

A. E. WOLTER 1,471,084

AUTOMOBILE SIGNAL

Filed Nov. 30, 1921

2 Sheets-Sheet 1

INVENTOR
Antone E. Wolter

BY
Pierre James
ATTORNEY

Oct. 16, 1923.  
A. E. WOLTER  
1,471,084  
AUTOMOBILE SIGNAL  
Filed Nov. 30, 1921  
2 Sheets-Sheet 2
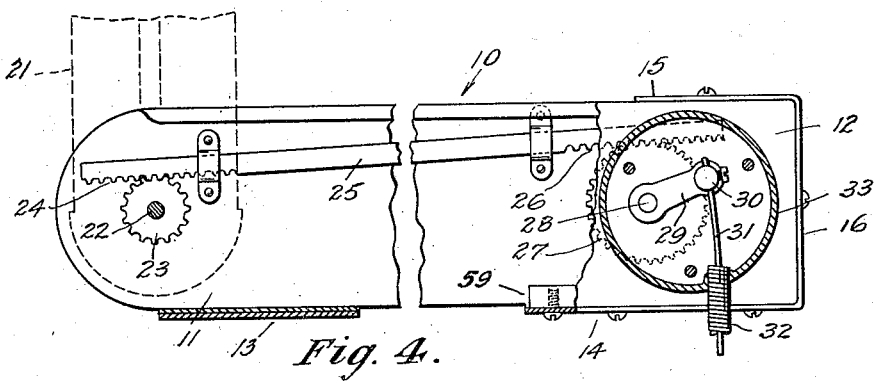
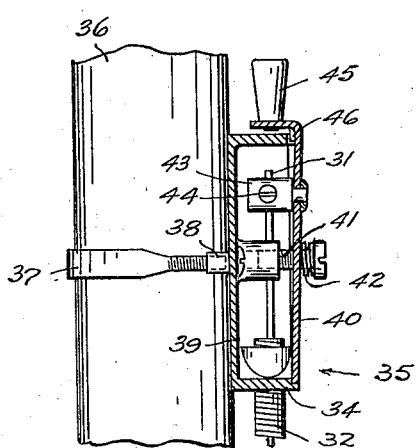
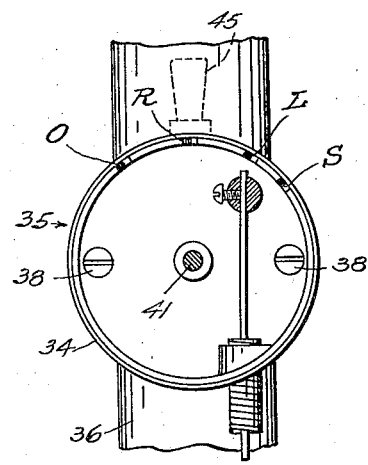
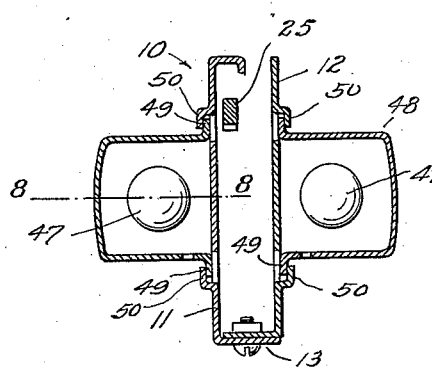
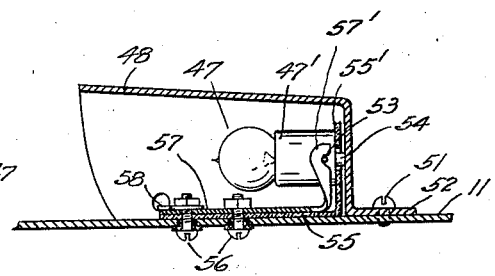
INVENTOR  
*Antone E. Wolter*  
BY  
*Pierre Barnes*  
ATTORNEY Patented Oct. 16, 1923.

1,471,084

UNITED STATES PATENT OFFICE.

ANTONE E. WOLTER, OF EVERETT, WASHINGTON.

AUTOMOBILE SIGNAL.

Application filed November 30, 1921. Serial No. 518,872.

*To all whom it may concern:*

Be it known that I, ANTONE E. WOLTER, a citizen of the United States, residing at Everett, in the county of Snohomish and State of Washington, have invented certain new and useful Improvements in Automobile Signals, of which the following is a specification.

This invention relates to visible direction-signals for motor vehicles and its object is the provision of simple, inexpensive, durable and efficient devices of this character which may be conveniently used by a vehicle driver to indicate his intention to turn or stop the vehicle.

The invention consists in the novel construction, arrangement and combination of parts hereinafter described and claimed.

In the accompanying drawings,—

Figure 1:
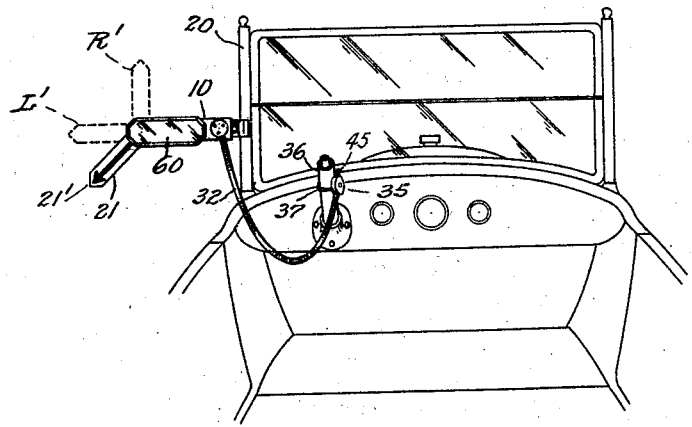
Figure 2:
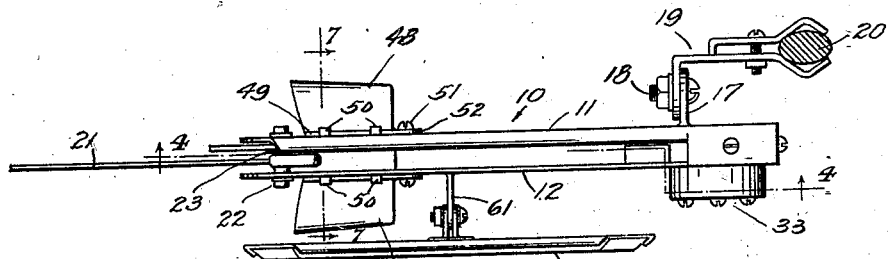
Figure 3:
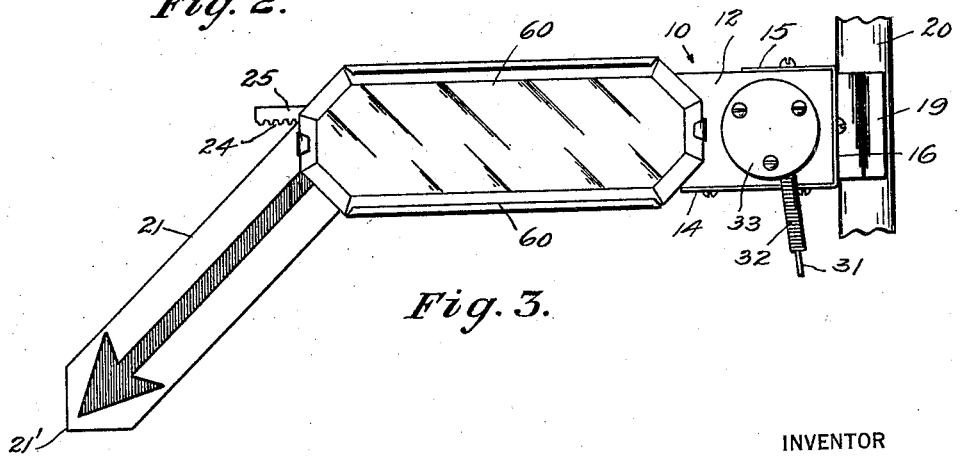

Figure 1 is a perspective view of the front portion of an automobile with the signal connected to the windshield and showing the operating member upon the steering column. Fig. 2 is a plan view of the signal attached to a windshield frame-post, which is shown in horizontal section. Fig. 3 is a rear elevational view of Fig. 2. Fig. 4 is a vertical section taken on broken line 4—4 of Fig. 2. Fig. 5 is an end view of the operating member with the cover and handle elements omitted. Fig. 6 is a vertical longitudinal sectional view of Fig. 5. Fig. 7 is a detail sectional view through 7—7 of Fig. 2; and Fig. 8 is a similar view taken substantially through 8—8 of Fig. 7.

In said drawings, the reference numeral 10 designates, generally, a casing of a substantially parallelopiped shape which, as shown, consists of front and rear walls 11 and 12 connected with each other adjacent to their outer ends by a floor 13, and are similarly connected at their inner ends by a floor 14, top wall 15 and end wall 16.

At or near its inner end the casing 10 is provided with a forwardly directed apertured lug 17 which is connected by a horizontally disposed securing bolt 18 to a clamping bracket 19 whereby the casing is secured to the side member 20 of a windshield frame. 21 represents a direction indicating arm, hereinafter designated as the "pointer," having one of its ends preferably pointed as at 21¹ and adjacent to its other end said pointer is secured to an arbor 22 whose ends are journaled in bearings provided therefor in the casing walls 11 and 12.

Also mounted upon the arbor 22 is a spur gear 23, see Fig. 4, which is in continuous mesh with rack teeth 24 of a rod 25 provided longitudinally within the casing and having rack teeth 26 engaging a spur pinion 27 which is mounted upon a shaft 28 located within the casing near the inner end of the latter. The shaft 28 is provided with a crank arm 29, to the crank pin 30 of which is secured the end of a flexible rod 31. This rod extends through a flexible guiding tube 32, one end thereof being attached to a receptacle 33 provided upon and constituting a part of said casing to accommodate the aforesaid crank 28. The other end of said tube is attached to the peripheral wall 34 of a cylindrical housing 35.

The housing 35 is rigidly secured to the column 36 of the automobile steering post or to any other suitable support within convenient reach of the driver. As shown in Figs. 5 and 6, said housing is coupled to the column by means of a stirrup strap 37 extending around the column and provided with screw threaded ends taking in cap nuts 38 which extend through and engage the back wall 39 of the housing.

The front wall, or cover plate 40 of the housing is rotatably mounted upon a central post 41 and is yieldingly held against the outer edge of the wall 34 by means of a spring 42 acting against the plate.

Carried by the plate 40 within the housing is a crank pin 43 to which the flexible rod 31 is secured as by means of a binding screw 44. As shown in Fig. 6, the plate 40 is provided with a handle 45 to effect revoluble movements of the crank pin 43 for imparting endwise movements to the flexible rod for regulating the pointer 21.

The plate 40 is provided, moreover, with a tooth 46 which is arranged to be brought into register with any one of a series of spaced notches, denoted by O, R, L and S, respectively, provided in the housing wall 34.

Included in the signal device are electrical means for illuminating the pointer when in its exposed positions. To which end, I provide at the front and rear of the casing in proximity of its outer end electric light bulbs 47 which are respectively encased in hood reflectors 48 arranged to mask the respective lights from being seen from both the front and rear of the vehicle. Each reflector is provided at the top and bottom of the same with flange elements 49 which engage under finger elements 50 provided in the respective casing wall 11 or 12.

A reflector is secured from accidental withdrawal from said fingers by means of a screw 51 extending through an apertured ear 52 of a reflector into a threaded hole in the adjacent wall of the casing. A light bulb 47 is provided at diametrically opposite sides of its ferrule $47^1$ with studs as 53, one being shown in Fig. 8, and serving mutually as one of the lamp contacts, the other contact of a bulb being afforded by an axially disposed projection 54. This type of light bulb is such as commonly used in automobile practice for tail-lights, etc.

According to the present invention a light bulb is engaged in its operative position by being seated against the outstanding part $55^1$ of a resilient strip 55 of electric insulating material which is secured by means of clamping screws 56 between the adjacent casing wall, as 11 in Fig. 8, and a metal plate 57 having a bifurcated portion $57^1$ which is adapted to engage the respective studs 53 for retaining the projection 54 against the associated reflector whereby the lamp circuit is grounded. The plate 57 constitutes the terminal of a conducting wire 58 leading from an electric battery, not shown.

59 represents a block of suitable resilient material to cushion the pointer when swung into its inoperative position within the casing.

A mirror 60 adjustably connected by an attachment 61, Fig. 2, to the casing is of advantage to the driver in obtaining a rear view.

In operation, the pointer 21 is moved into a selected position by means of the gear 23 and rack bar 25 from the pinion 27 which, in turn, is rotatably moved by means of the flexible rod 31 which operatively connects the crank 29 of the pinion shaft with the crank pin 43 on the rotary cover plate 40 of housing 35.

This plate 40 is controlled by the handle 45 to cause the pointer 21 to be moved into a predetermined position as will be regulated by the registering of the tooth 46 with a selected one of the housing notches.

The positions of the pointer according to the present invention preferably correspond with the conventional positions assumed by a person's arm in signalling from a vehicle, that is to say—when pointing upwardly as denoted by dotted lines $R^1$ (Fig. 1) the vehicle is to turn toward the right; when horizontal, as denoted by $L^1$, toward the left; and when giving notice of stopping the pointer is directed downwardly as represented by full lines in Figs. 1 and 3.

The housing notches R, L, and S are located to receive the tooth 46 of the operating plate 40 when the same has been suitably manipulated to cause the pointer to be presented in the respective positions above referred to. The other notch O, Fig. 5, is disposed to receive the tooth when the pointer is swung into the casing and, like the remaining notches—R, L, and S—serve with the tooth to releasably lock the pointer operating mechanism for retaining the pointer in selected positions.

What I claim, is,—

In a signal for motor vehicles, the combination of a casing adapted to be secured at one end thereof to a vehicle, a signalling arm pivotally connected to one end of said casing, and normally housed within the latter, a crank shaft provided in the other end of the casing, operative connections between said arm and the crank shaft, a flexible rod connected at one of its ends to the crank of said shaft, rotatable means connected to the other end of the flexible rod for effecting axial movements to the rod for positively transmitting movements in opposite rotary directions selectively to the signalling arm, means engageable with the aforesaid means for releasably retaining the signalling arm in a selected position, and means provided upon the casing for illuminating the front and rear sides of the signalling arm when the same is in its several signalling positions.

Signed at Seattle, Washington, this 23rd day of November 1921.

ANTONE E. WOLTER.

Witnesses:
PIERRE BARNES,
MARGARET G. SUPPLE.